United States Patent [19]

Miyashita

[11] Patent Number: 5,129,079
[45] Date of Patent: Jul. 7, 1992

[54] COMPUTER SYSTEM HAVING SUBINSTRUCTION SURVEILLANCE CAPABILITY

[75] Inventor: Takumi Miyashita, Inagi, Japan

[73] Assignee: Fujitsu Limited, Kawasaki, Japan

[21] Appl. No.: 596,745

[22] Filed: Oct. 15, 1990

Related U.S. Application Data

[63] Continuation of Ser. No. 281,932, Dec. 15, 1988, abandoned, which is a continuation of Ser. No. 830,191, Feb. 18, 1986, abandoned.

[30] Foreign Application Priority Data

Feb. 18, 1985 [JP] Japan .................. 60-28402

[51] Int. Cl.⁵ .................. G06F 9/26; G06F 11/00
[52] U.S. Cl. .................. 395/575; 364/DIG. 1;
364/264; 364/264.1; 364/265; 364/265.4;
364/265.6; 364/266; 364/267; 364/267.4;
364/267.6; 364/267.8; 371/15.1
[58] Field of Search ... 364/200 MS File, 900 MS File;
371/15.1, 16.1, 16.2, 22.5, 27

[56] References Cited

U.S. PATENT DOCUMENTS

| | | | |
|---|---|---|---|
| 3,898,623 | 8/1975 | Cormier | 364/200 |
| 3,997,895 | 12/1976 | Cassonnet et al. | 364/200 |
| 4,205,370 | 5/1980 | Hirtle | 364/200 |
| 4,240,138 | 12/1980 | Chauvel | 364/200 |
| 4,312,034 | 1/1982 | Gunter et al. | 364/200 |
| 4,325,121 | 3/1982 | Gunter et al. | 364/200 |
| 4,338,661 | 7/1982 | Tredennick et al. | 364/200 |
| 4,342,078 | 7/1982 | Tredennick et al. | 364/200 |
| 4,348,722 | 9/1982 | Gunter et al. | 364/200 |
| 4,349,873 | 9/1982 | Gunter et al. | 364/200 |
| 4,392,208 | 7/1983 | Burrows et al. | 364/900 |
| 4,398,244 | 8/1983 | Chu et al. | 364/200 |
| 4,429,368 | 1/1984 | Kurii | 364/580 |
| 4,458,313 | 7/1984 | Suzuki et al. | 364/200 |
| 4,559,596 | 12/1985 | Ohnishi | 364/200 |
| 4,571,677 | 2/1986 | Hirayama et al. | 364/200 |
| 4,607,366 | 8/1986 | Stadlmeier et al. | 371/16 |
| 4,635,193 | 1/1987 | Moyer et al. | 364/200 |

FOREIGN PATENT DOCUMENTS 0194185 9/1986 European Pat. Off. .
2948644 6/1981 Fed. Rep. of Germany .

OTHER PUBLICATIONS

R. Moreau "Trace Storing Unit", IBM Technical Disclosure Bulletin, vol. 22, No. 8A (Jan. 1980), pp. 3245-3246.
D. Ajmera et al., "Bipolar building blocks deliver supermini speed to microcoded system", Electronic Design, vol. 32, No. 23, (Nov. 15, 1984), pp. 230-246.

Primary Examiner—Thomas C. Lee
Assistant Examiner—Robert B. Harrell
Attorney, Agent, or Firm—Staas & Halsey

[57] ABSTRACT

A computer system including: a unit (10) processing instructions containing microprogram instructions, including a first circuit (4) storing at least one instruction code group having a plurality of sub-instruction codes performing a corresponding microprogram instruction; a second circuit (1, 2, 3, 5) decoding a microprogram instruction and advancing an address of subinstructions of the microprogram instruction in response to contents of the subinstruction codes; and a third circuit (6) executing the subinstructions in response to subinstruction codes from the instruction code store circuit. The instruction code store circuit further stores a plurality of other subinstruction codes performing control of the instruction processing circuit in a debug-mode operation. The computer system also includes a control unit (40) comparing an address preset thereto and another address from the instruction decode circuit designating the subinstruction codes in the instruction code store circuit, stopping the operation of the subinstruction, and supplying at least one control data including control bits and an address designating the other subinstruction codes when the preset address coincides with the other address. The instruction execute circuit executes subinstructions of the other subinstruction codes in response to the control bits to monitor each subinstruction's operation state. The control unit may restore the stopped operation of the subinstruction when a reset signal is supplied thereto.

14 Claims, 9 Drawing Sheets

| BHE | Ao | |
|---|---|---|
| 0 | 0 | WORD ACCESS |
| 0 | 1 | ODD-BYTE ADDRESS ACCESS |
| 1 | 0 | EVEN-BYTE ADDRESS ACCESS |
| 1 | 1 | WORD ACCESS ON DEBUG-MODE |

MICRO-CODE: "80 34 12" = "ADD IMMEDIATE TO G-REG. A"
— OPERAND
— LOWER DATA
— UPPER DATA

| TIME | EVENTS & CONDITION | MICRO-ADD | OPERATIONS |
|------|--------------------|-----------|------------|
| t0 | "START" | "000" ⋯ | |
| t1 | "ACT" FROM EXT | "020" ⋯ → "021" ⋯ | |
| t2 | $\overline{BHE}$=1, A0=1 & READ-CYCLE | "030" ⋯ → "031" ⋯ | LOAD CONTROL DATA (Fig.9a) INTO FIFO-A |
| t3 | EXECUTE "ADD-IMM-DATE TO G-REG. A" | "050" ⋯ → "051" ⋯ | |
| t4 | BPR=MICRO-ADD | "052" | (1) EXECUTE TRANSFER DATA IN REGISTERS TO FIFO-B (Fig. 9b) |
| t5 | | | (2) LOAD CONTROL DATA(Fig.9c) INTO FIFO-A |
| t6 | | | (3) OUTPUT DATA IN FIFO-B TO COM-R2 |
| t7 | | "053" ⋯ | (4) RETURN TO MICRO-ADD "053" |

Fig. 8

| MICRO-ADD | CONTENTS OF MICROCODE |
|---|---|
| "050" | Q1-REG TO TEMP-REG. aL |
| "051" | Q2-REG TO TEMP-REG. aH |
| "052" | G-REG. A TO TEMP-REG. b |
| "053" | ALU TO G-REG. A, END |

Fig. 9a

| NO. | 15 | 14 | 13 | 12 | 11 - - - - - 0 |
|---|---|---|---|---|---|
| 1 | 0 | 1 | 0 | 0 | "052" |
| 2 | 1 | 0 | 0 | 1 | "000" |
| 3 | 1 | 0 | 0 | 1 | "001" |
| 4 | 1 | 0 | 0 | 1 | "004" |
| 5 | 1 | 0 | 0 | 1 | "005" |
| 6 | 1 | 0 | 0 | 1 | "006" |
| 7 | 1 | 0 | 0 | 1 | "007" |
| 8 | 0 | 0 | 1 | 0 | "011" |

Fig. 9b

| ADDRESS | INSTRUCTION |
|---|---|
| "000" | T-REG. a TO COM-R2 |
| "001" | T-REG. b TO COM-R2 |
| "004" | IR TO COM-R2 |
| "005" | Q1-REG TO COM-R2 |
| "006" | Q2-REG TO COM-R2 |
| "007" | Q3-REG TO COM-R2 |
| "011" | G-REG. A TO COM-R2 |

Fig. 9c

| NO. | 15 | 14 | 13 | 12 | 11 — — — 0 |
|---|---|---|---|---|---|
| 1 | 1 | 0 | 0 | 1 | "008" |
| 2 | 1 | 0 | 0 | 1 | "008" |
| 3 | 1 | 0 | 0 | 1 | "008" |
| 4 | 1 | 0 | 0 | 1 | "008" |
| 5 | 1 | 0 | 0 | 1 | "008" |
| 6 | 1 | 0 | 0 | 1 | "008" |
| 7 | 1 | 0 | 0 | 1 | "008" |
| 8 | 1 | 1 | 1 | 1 | "008" |

Fig. 9d

| ADDRESS | INSTRUCTION |
|---|---|
| "008" | OUTPUT DATA IN FIFO-B TO COM-R2 |

Fig. 10

COMPUTER SYSTEM HAVING SUBINSTRUCTION SURVEILLANCE CAPABILITY

This is a continuation of co-pending application Ser. No. 07/281,932, now abandoned, filed on Dec. 15, 1988, which is a continuation of Ser. No. 06/830,191, now abandoned, filed on Feb. 18, 1986.

BACKGROUND OF THE INVENTION

1. Field of the Invention

The present invention relates to a computer system, more particularly, to a computer system having a microprogram instruction surveillance configuration.

2. Description of the Related Art

In computer systems, generally, a plurality of microprogram instructions performed by corresponding microprograms are provided in addition to the corresponding macro instructions, such as a LOAD instruction or a STORE instruction. One of the microprogram instructions can be used as a single macro in programs, simplifying use thereof. Each microprogram instruction consists of a plurality of subinstructions (or microinstructions), and thus can provide a composite function which cannot be performed by a macro instruction. On the other hand, the operation thereof differs from that of a normal macro instruction. Accordingly, a special logic circuit effecting the microprogram, instructions each of the microinstructions, must be provided in the computer system.

Programmers do not have to understand the subinstructions or microinstructions forming each microprogram instruction and circuit functions of special logic circuits, such as special registers used for performing the microprogram since the microprogram or microinstructions are stored in a read-only memory (ROM) or provided by a firmware as single instructions without any program error. Accordingly, the computer system is not provided with surveillance (or monitor) functions, for example, for directly accessing internal registers in the special logic circuit, temporary stopping the subinstructions (microinstructions), or tracing or tracking the subinstructions or microinstructions.

However, users may frequently suffer from trouble with the microprogram due to initial faults in the circuits performing the microprogram, external noise, program bugs, etc. In the case of such trouble, it is possible to run a hardware test, however, this is normally not very efficient and is limited to analyzing such trouble.

Other trouble with the microprogram may arise due to illegal use of the micro-microinstructions, for example, an illegal parameter set. Such trouble cannot be effectively solved by a hardware test.

Japanese Unexamined Patent Publication No. 58-195252 discloses a microprogram control apparatus for stopping the operation of a subinstructions or microinstruction during the execution of a microprogram when an address of the subinstructions or microprograms coincides with a set address to be stopped. The control apparatus stops the generation of a clock pulse. Accordingly, there may be trouble in the restart operation. The control apparatus also lacks surveillance functions for analyzing trouble quickly and efficiently.

SUMMARY OF THE INVENTION

An object of the present invention is to provide a computer system having an instruction surveillance configuration performing control of microprogram and subinstructions or microinstructions forming the microprogram.

Another object of the present invention is to provide a computer system having an instruction surveillance configuration performing the trace of operations of the microprogram instructions and subinstructions (microinstructions).

Still another object of the present invention is to provide a computer system having an instruction surveillance configuration including the above functions with a simple and small circuit configuration and ease of use.

According to the present invention, there is provided a computer system including a unit processing instructions containing a microprogram, including a first circuit storing at least one instruction code group having a plurality of sub-instruction codes or microinstructions codes performing a corresponding microprogram (the function of the microprogram instruction); a second circuit operatively connected to the instruction code store circuit, decoding a microprogram instruction, and advancing an address of subinstructions or microinstructions of the microprogram instruction, defined by the subinstructions or microinstructions codes, in response to contents of the subinstructions or microinstruction codes; and a third circuit operatively connected to the instruction code store circuit and the instruction decode circuit, executing the subinstructions or microinstructions in response to subinstructions codes from the instruction code or microinstruction code store circuit. The instruction code store circuit further stores a plurality of other subinstructions or microinstruction codes performing control of the instruction processing circuit. The computer system also includes a control unit operatively connected to the instruction processing circuit, comparing an address preset thereto and another address from the instruction decode circuit designating the subinstructions codes or microinstruction in the instruction code store circuit, and stopping the operation of the subinstructions and supplying at least one control data including control bits and an address designating other subinstructions or microinstruction codes in the instruction code store circuit when the preset address coincides with the other address. The third circuit executes the subinstructions or microinstruction of the other subinstructions codes in response to the control bits in the control data.

The control unit may restore the stopped operation of the subinstructions when a reset signal is supplied thereto.

The computer system may include a bus interface unit, operatively connected to the instruction processing unit and the control unit through a data bus. The control unit may also include a memory storing the control data. The bus interface unit stores a plurality of control data to the memory and sets the preset address to the control unit through the data bus in response to an application of control signals, so that the third circuit continuously executes the other subinstructions corresponding to addresses of the control data in response to control bits of the control data when the preset address coincides with the other address from the instruction decode circuit.

The control circuit may include a register holding the preset address, a compare circuit comparing the preset address and another address from the instruction decode circuit and outputting a coincidence signal when the preset address coincides with another address, a latch circuit latching the coincidence signal, a first gate gating another address passing therethrough, a second gate gating the control data passing therethrough, and a switch circuit. The first gate and said second gate are operated reversely in response to the coincidence signal, the first gate becoming a closed state passing another address therethrough when the coincidence signal is disable. Otherwise, the second gate passes the control data from the memory therethrough. The switch circuit supplies the other address to the compare circuit when the coincidence signal is disabled. Otherwise, the control data is supplied to the instruction code store circuit through the instruction decode circuit.

According to the present invention, there is also provided a computer system including a unit processing instructions containing a microprogram, including a circuit storing at least one instruction code group having a plurality of subinstructions or microinstruction, codes performing a corresponding microprogram; a circuit, operatively connected to the instruction code store circuit, decoding a microprogram instruction, and advancing an address of subinstructions or microinstructions of the microprogram, defined by the subinstructions codes, in response to contents of the subinstructions or microinstructions, codes; and a circuit, operatively connected to the instruction code store circuit and the instruction decode circuit, executing subinstructions or microinstructions in response to subinstructions or microinstruction codes from the instruction code store circuit. The computer system also includes a control unit, operatively connected to the instruction processing circuit, storing the subinstructions codes from the instruction decode circuit, and outputting the same in response to control signals. The control unit may store data combined with an address of the subinstructions or microinstruction code and control states in the instruction processing circuit and output the same.

According to the present invention, there is further provided a computer system including a control unit, operatively connected to the instruction processing circuit, comparing an address preset thereto and another address from the instruction decode unit designating the subinstruction or microinstruction codes in the instruction code store circuit, stopping the operation of the subinstructions or microinstruction when the preset address coincides with the other address.

The control unit may restore the stopped operation of said subinstructions when a reset signal is supplied thereto.

BRIEF DESCRIPTION OF THE DRAWINGS

Other objects and features of the present invention will be described below in detail with reference to the accompanying drawings, in which.

DESCRIPTION OF THE PREFERRED EMBODIMENTS

Figure 1:
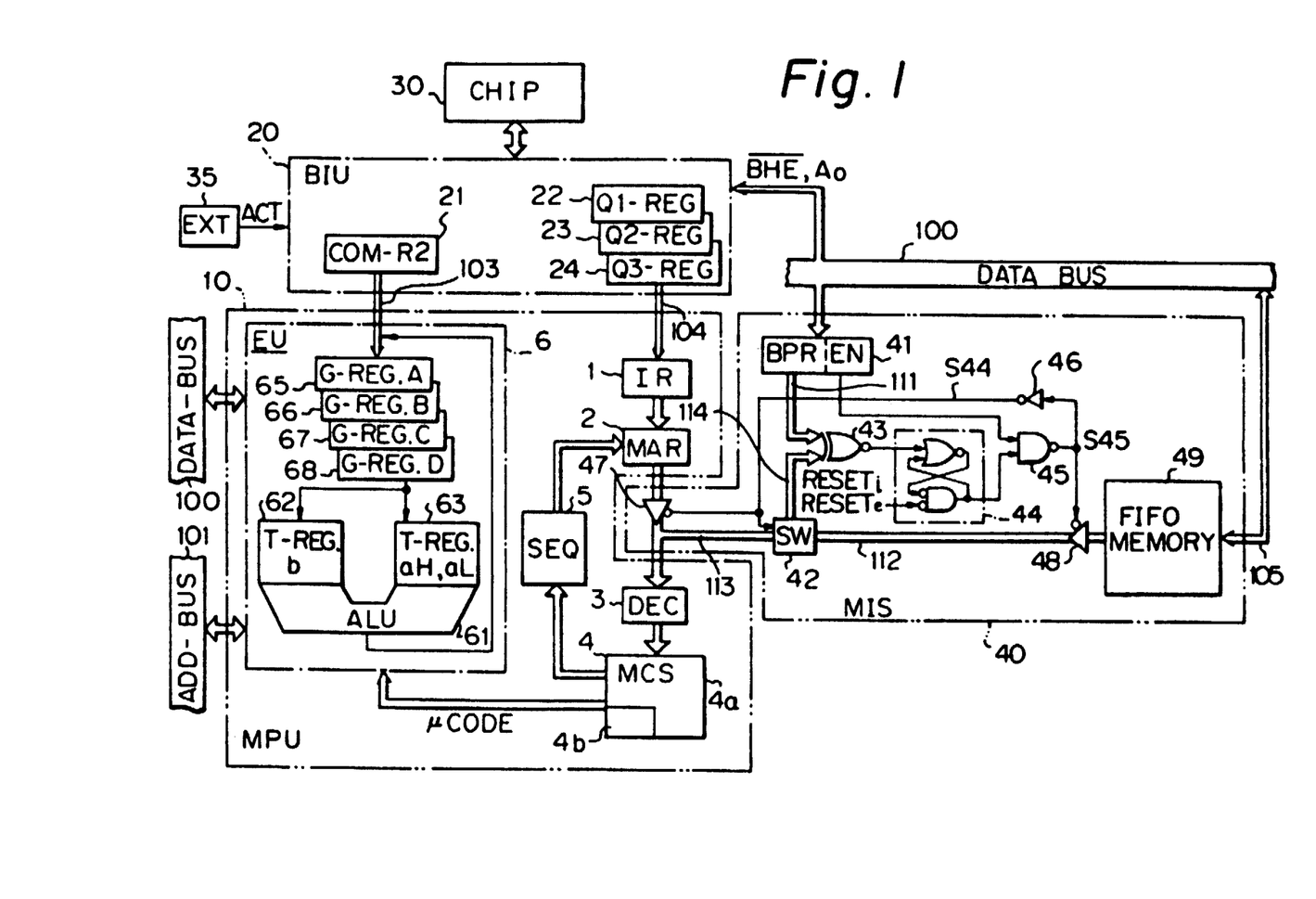
FIG. 1 is a block diagram of an embodiment of a computer system having an instruction surveillance configuration in accordance with the present invention.

Referring to FIG. 1, a computer system includes a microprocessor unit (MPU) 10, a bus interface unit (BIU) 20, a main memory chip (CHIP) 30, an external signal input circuit (EXT) 35, a microprogram instruction surveillance unit (MIS) 40, a data bus (DATA-BUS) 100, and an address bus (ADD-BUS) 101.

The MPU 10 includes an instruction register (IR) 1 of 16 bits, a microaddress register (MAR) 2 of 16 bits, a decoder (DEC) 3, a microprogram code storage (MCS) 4, a sequencer (SEQ) 5, and an instruction execution unit (EU) 6. The MCS 4 stores a plurality of subinstructions or microinstruction groups each consisting of a plurality of subinstructions or microinstruction corresponding to a microprogram instruction where a microprogram instruction designates a microprogram. The MCS 4 consists of two regions 4a and 4b, the former 4a being accessible by the programs, however, the latter 4b not being accessible. The EU 6 includes an arithmetic operation logic circuit unit (ALU) 61, a temporary register b (T-REG.b) 62 of 16 bits, a temporary register a (T-REG.a) 63 of 16 bits and consisting of a higher 8-bit register (aH) and a lower 8-bit register (aL), and four general registers (G-REG.A to G-REG.D) 65 to 68. G-REG.A to G-REG.D can be accessed by the programs through instructions containing normal single instructions and the microprogram instructions, however, the IR, the MAR, and the T-REG a and b cannot.

The BIU 20 includes a communication register (COM- R2) 21 of 16 bits and Q-registers (Q1-REG to Q3-REG) 22 to 24, each of 16 bits. COM-R2 and Q1-REG to Q3-REG cannot accessed by the programs.

The MIS 40 includes a break point register (BPR) 41 having or target address register an enable (EN) bit, a bus switching circuit (SW) 42 switching internal buses 112 and 113, an exclusive NOR circuit (ENOR) 43, a set-reset type flip-flop circuit (FF) 44 including a NOR gate and a NAND gate connected between them forming the set-reset flip-flop, a NAND gate (NAND) 45, and an inverter (INV) 46. The MIS 40 also includes output gates 47 and 48 and an FIFO memory 49.

Figure 2:
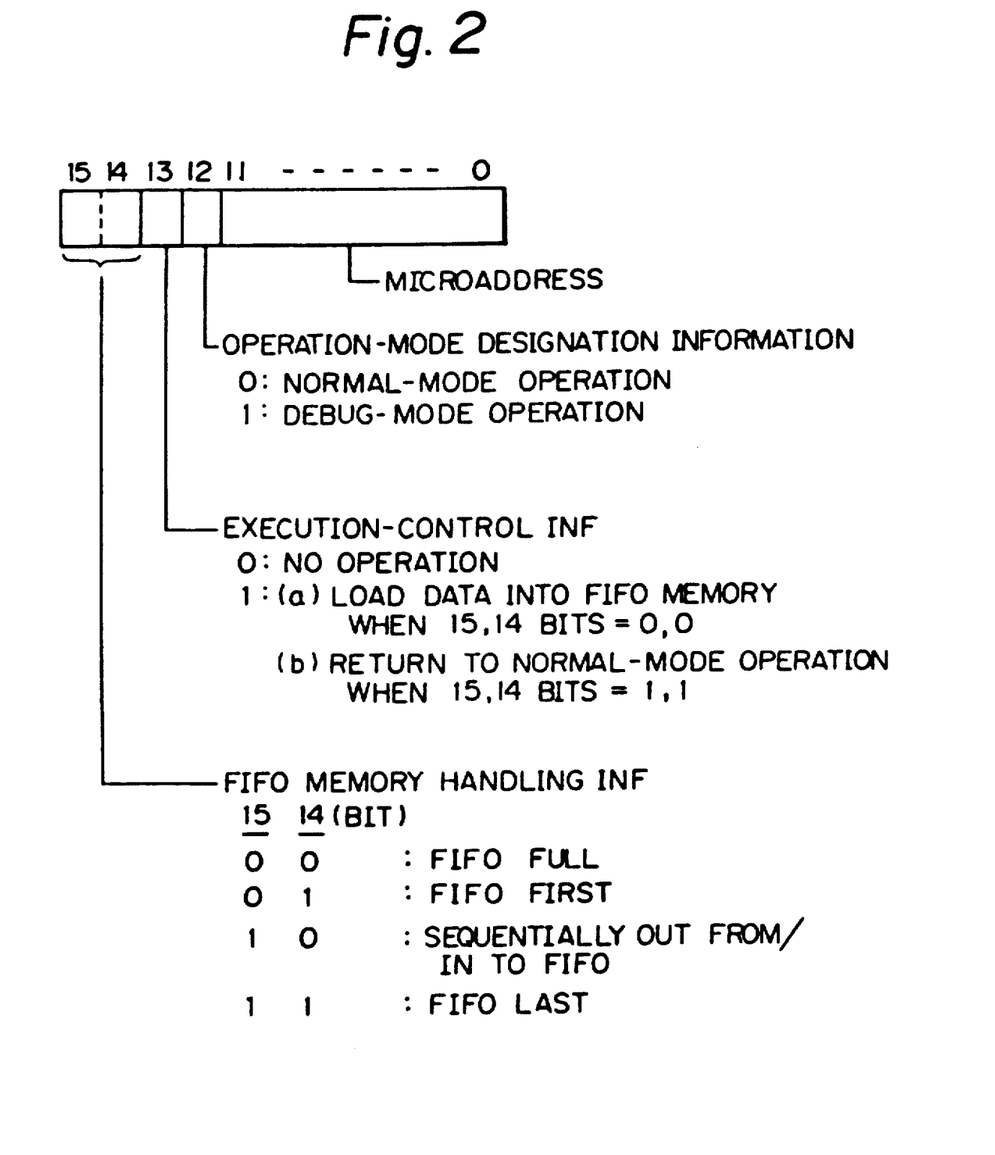
FIG. 2 is a view illustrating a configuration of data in a first-in first-out (FIFO) memory in FIG. 1.

FIG. 2 is a view illustrating a configuration of data stored in the FIFO memory 49. The FIFO memory 49 stores a plurality of microprogram instruction control data, each having the configuration in FIG. 2. In FIG.

2, 15 to 12 bits include control information and 11 to 0 bits include a microaddress in the MCS 4. Bit 15 represents an operation mode, that is, logical "0" designates a normal-mode operation, otherwise, a debug-mode operation for analysis of the operation of the microprogram instructions in detail. Bit 14 represents a type of execution control in combination with bits 15 and 14. Logical "0" of bit 14 indicates "NO OPERATION", otherwise, "LOAD DATA INTO FIFO MEMORY 49" when bits 15 and 14 are logical "0"s, or "RETURN TO NORMAL-MODE OPERATION FROM DEBUG-MODE OPERATION" when bits 15 and 14 are logical "1"s. On the other hand, the combinations of bits 15 and 14 indicate the following statuses:

| BIT | 15 | 14 | |
|---|---|---|---|
| | 0 | 0 | FIFO memory is full. |
| | 0 | 1 | First-in to FIFO memory |
| | 1 | 0 | Continue sequential output from or input to FIFO memory |
| | 1 | 1 | First-out from FIFO memory |

Figure 3:
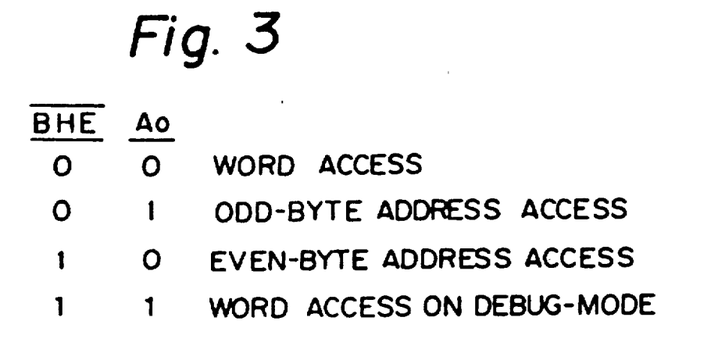
FIG. 3 is a view explaining an operation mode classification in the computer system in FIG. 1.

Referring back to FIG. 1, the BIU 20 receives an active signal "ACT" from the EXT 35 and an inverted bus high enable signal $\overline{BHE}$ and an $A_0$ bit signal from the DATA-BUS 100. The $\overline{BHE}$ signal and the $A_0$ bit signal in combination, also indicate instructions to the BIU 20 as shown in FIG. 3, that is:

| BHE | $A_0$ | |
|---|---|---|
| 0 | 0 | WORD ACCESS on a normal-mode |
| 0 | 1 | ODD BYTE ADDRESS ACCESS on a normal-mode |
| 1 | 0 | EVEN BYTE ADDRESS ACCESS on a normal-mode |
| 1 | 1 | WORD ACCESS on a debug-mode |

The operation of the computer system shown in FIG. 1 will be described.

When the operation of the computer system is in the normal mode, an enable bit in DATA-BUS 100 is logical "0", i.e., low level. When the break point register 41 receives an address or target address, and the enable bit of logical "0", the EN bit of logical "0" is applied to an input terminal of the NAND gate 45, resulting in an output signal S45 being logical "1", i.e., high level. In response to an activate signal of low level through INV 46, the output gate 47 low-selected to allow flow of data from the MAR 2 to the DEC 3 passing therethrough. On the other hand, the output gate 48 becomes an open state inhibitting the flow of data from the FIFO memory 49 to the SW 42.

Upon loading of a microprogram instruction into the IR 1 from the CHIP 30 through the QI-REG 22 and a line 104, a start address ST-ADD is extracted therefrom, applying the ST-ADD and the instruction code to the DEC 3 through the MAR 2 and the output buffer 47 enable the ST-ADD passing therethrough. The DEC 3 applies the ST-ADD as a start address to the MCS 4, which stores a plurality of subinstructions or microinstructions corresponding to the microprogram, with a resultant microinstruction code μCODE being extracted from the MCS 4 and accordingly applied to the EU 6. The EU 6 executes a subinstructions corresponding to the μCODE through the ALU 61 and the registers 62 to 68 therein and the COM-R2 21 in the BIU 20. Simultaneously, an operation for proceeding to a next subinstructions or microinstruction of the microprogram is effected through the SEQ 5 and the MAR 2. Subsequent operations of subsequent microinstruction codes are thus effected.

In the prior art computer systems, the operation of any subinstructions for performing the microprogram instruction cannot be controlled by either an external request from a user or an internal request from a Program Provided by a user. Accordingly, each state and content of the subinstructions of the μCODE cannot be monitored.

Next, the operation of the computer system under the debug-mode will be described. In this case, the enable bit in DATA-BUS 100 may be logical "1".

Prior to loading the above target address data from the DATA-BUS 100 to the break point register 41, the signals BHE of logical "1" and Ao of logical "1" on the DATA-BUS 100 and the signal ACT from the EXT 35 are supplied to the BIU 20, loading a plurality of data for controlling microinstruction codes μCODE from the EU 6 into the FIFO memory 49 through the DATA-BUS 100. The break point register 41 receives the target address and an enable bit of logical "1" on the DATA-BUS 100, thus supplying the target address to an input of the ENOR 43 through a bus 111 and bit EN of high level to the input of the NAND gate 45. In an initial condition, the FF 44 is reset, outputting a signal of low level. Accordingly, the signal S45 at the NAND gate 45 is high level. The output gate 47 is low-selected to allow flow of data from the MAR 2 to the DEC 3 and supplying the same to another input of the ENOR 43 through the SW 42. On the other hand, the output gate 48 becomes an open state. The SW 42 is operable in response to a signal S44 from the INT 44 to pass data on a bus 113 to a bus 114 connected to the other input of the ENOR 43 when the signal S44 is low level, otherwise, data on a bus 112 to the bus 113.

When the target address from the break point register 41 does not coincide with an address from the MAR 2, an output of the ENOR 43 is high level, resulting in the FF 44 being not set. The signal S45 is maintained on that level. Accordingly, the operation of the microprogram instruction may be effected in the MPU 10.

When the target address from the break point register 41 coincides with the address from the MAR 2, the output of the ENOR 43 becomes low level, resulting in the FF 44 being set and thus rendering the signal S45 low level. Due to the change of the signal S45, the output gate 47 becomes an open state and the output gate 48 becomes a low-select state passing data from the FIFO memory 49 to the bus 112. Simultaneously, the SW 42 becomes a state transferring the data on the bus 112 to the bus 113. Data stored in the FIFO memory 49 may be supplied to the DEC 3 instead of the addresses from the MAR 2. Bit 12 of each data in the FIFO memory 49 may be logical "1" indicating the debug-mode operation, as shown in FIG. 2. Bit 15 of each data in the FIFO memory 49 may also be logical "1" indicating "sequentially output data from the FIFO memory 49" in this case. The last data may be of bits 15 and 14, both logical "1", indicating "RETURN TO NORMAL-MODE OPERATION". The MCS 4 is divided into two regions 4a and 4b. The region 4a stores a plurality of microinstruction code groups each consisting of a plurality of microinstruction codes corresponding to one microprogram instructions used in the programs. The region 4b stores a plurality of microinstruction codes used only for the debug-mode operation, for controlling the microprogram instructions. An address of bits 11 to 0 included in the data, as shown in FIG. 2, can designate not only the region 4b but also the region 4a. After coincidence with both addresses at the ENOR 43, the MPU 10, the BIU 20, etc. may be operated in accordance with the subinstructions of the microcodes in the MCS 4 designated by the data from the FIFO memory 49. The analysis of the microprogram instruction will be described later in detail with reference to specific examples. Upon application of the data of bits 15 and 14 of logical "1" indicating "RETURN TO NORMAL-MODE OPERATION" to the DEC 3, the debug-mode operation is released to restored the normal-mode operation. Simultaneously, an internal RESETi signal is supplied to a reset terminal of the FF 44, resulting in the FF 44 being reset and thus rendering the output gate 47 into an enable state passing the data therethrough and the output gate 48 into a disable state. An external RESETe signal can be applied to the reset terminal of the FF 44 for a compulsory mode change from the debug-mode to the normal-mode.

In the above embodiment, continuous and external control to the MPU 10 was described. If a step by step manner of external control to the MPU 10 is required, it is possible, for example, to apply a stop signal to the SEQ 5, after coincidence with the break point address from the break point register 41 and a start address from the MAR 2 at the ENOR 43, so the FIFO memory 49 storing a plurality of control data is not required. The stop signal is applied for every microinstruction code execution, thus an operator can watch contents of desired registers, for example, not only the G-REG.A to G-REG.D but also the T-REG.a and b, the IR, etc., which cannot be accessed by the programs. As the external RESETe signal is supplied to the FF 44, the normal-mode operation will be restored.

Figure 4:
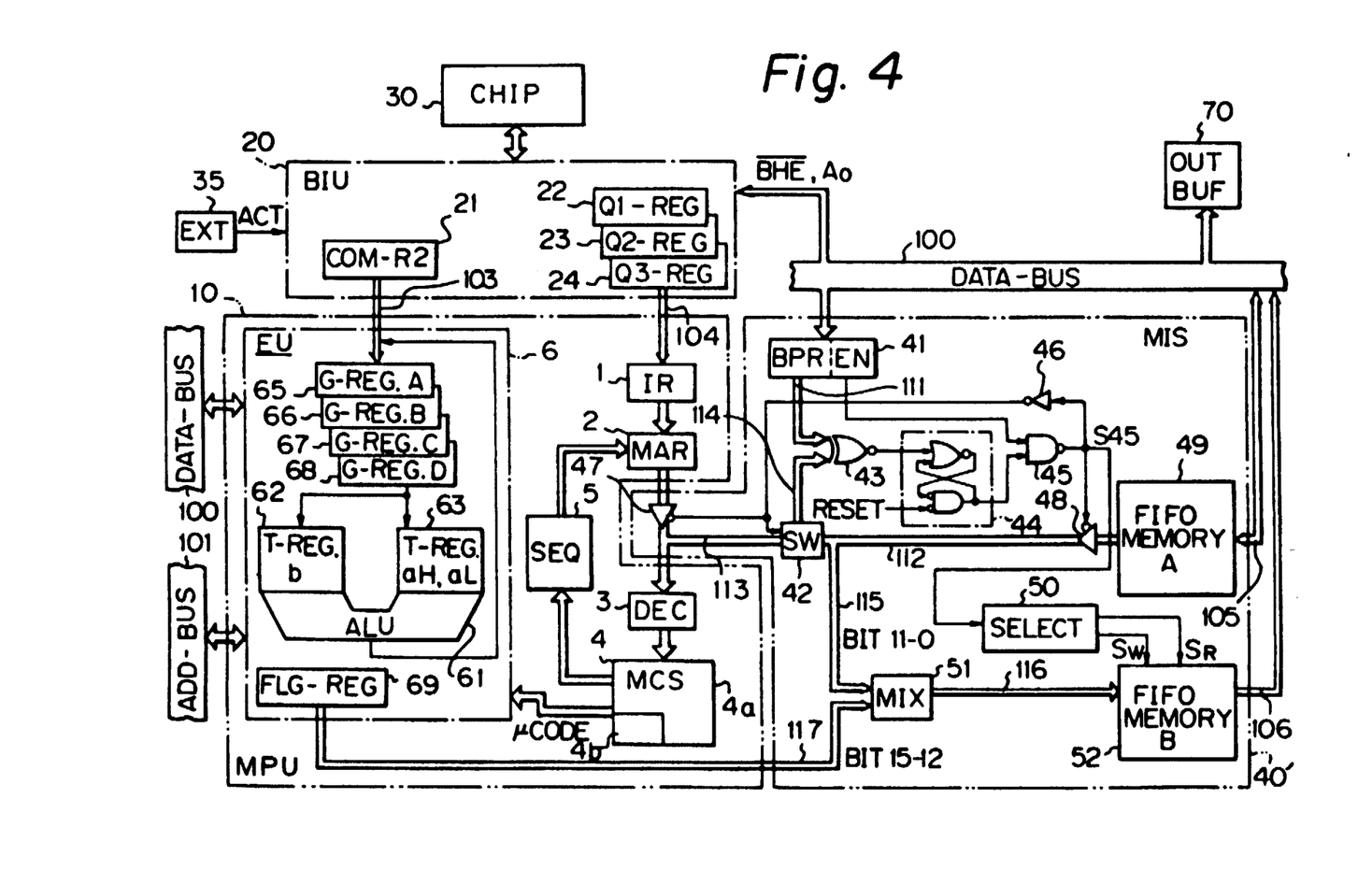
FIG. 4 is a block diagram of another embodiment of a computer system having an instruction surveillance configuration in accordance with the present invention.

FIG. 4 is a block diagram of another embodiment of a computer system.

In FIG. 4, the MPU 10, the BIU 20, the CHIP 30, and the EXT 35 are similar to those in FIG. 1, except that a flag register (FLG-REG) 69 is shown in the EU 6 in a relationship of a MIS 40'. The MIS 40' includes a selection circuit (SELECT) 50, a signal mixing circuit (MIX) 51, an a FIFO memory 52, in addition to the MIS 40 shown in FIG. 1, to perform additional instruction surveillance. The computer system in FIG. 4 further includes an output buffer (OUT-BUF).

The SELECT 50 outputs a write command $S_W$ or a read command $S_R$ to the FIFO memory B 52 in response to the signal S45 at the NAND gate 45. The MIX 51 combines an address of bits 11 to 0 on a bus 115 and a flag information of bits 15 to 12 from the FLG-REG 69 in the EU 6. The FIFO memory 52 stores the data from the MIX 51, when the signal $S_W$ is supplied thereto, or, reads out the data stored therein to the DATA-BUS 100, when the signal $S_R$ is supplied thereto, in a FIFO manner.

Figure 5:
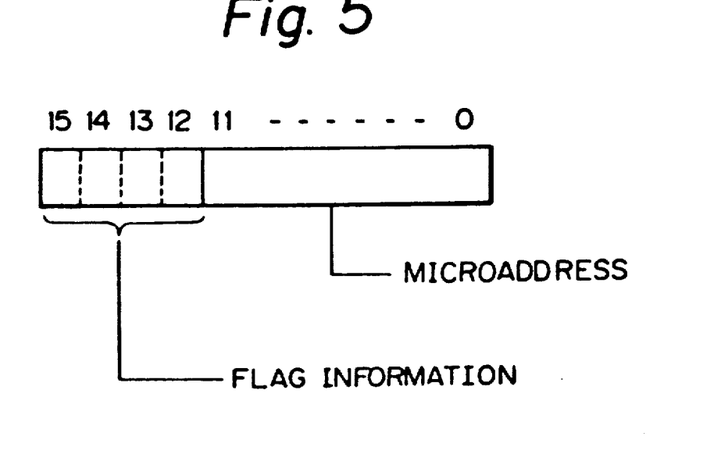
FIG. 5 is a view illustrating a configuration of data in another FIFO memory in FIG. 4.

FIG. 5 is a view illustrating a data configuration mixed at the MIX 51, accordingly, a view data configuration in the FIFO memory 52. Bits 15 to 12 are of flags indicating states of the registers in the MPU 10. Bits 11 to 0 are of a microaddress in the MCS 4. From the data shown in FIG. 5, the content of the microinstruction code and the states at the time may be analyzed.

Data on the DATA-BUS 100 from the FIFO memory 52 is transferred to the OUT-BUF 70 to output them on, for example, a cathode ray tube (CRT) display or a printer (not shown).

The operation of the computer system shown in FIG. 4 will be describe with reference to FIGS. 5 to 9.

Figure 6:
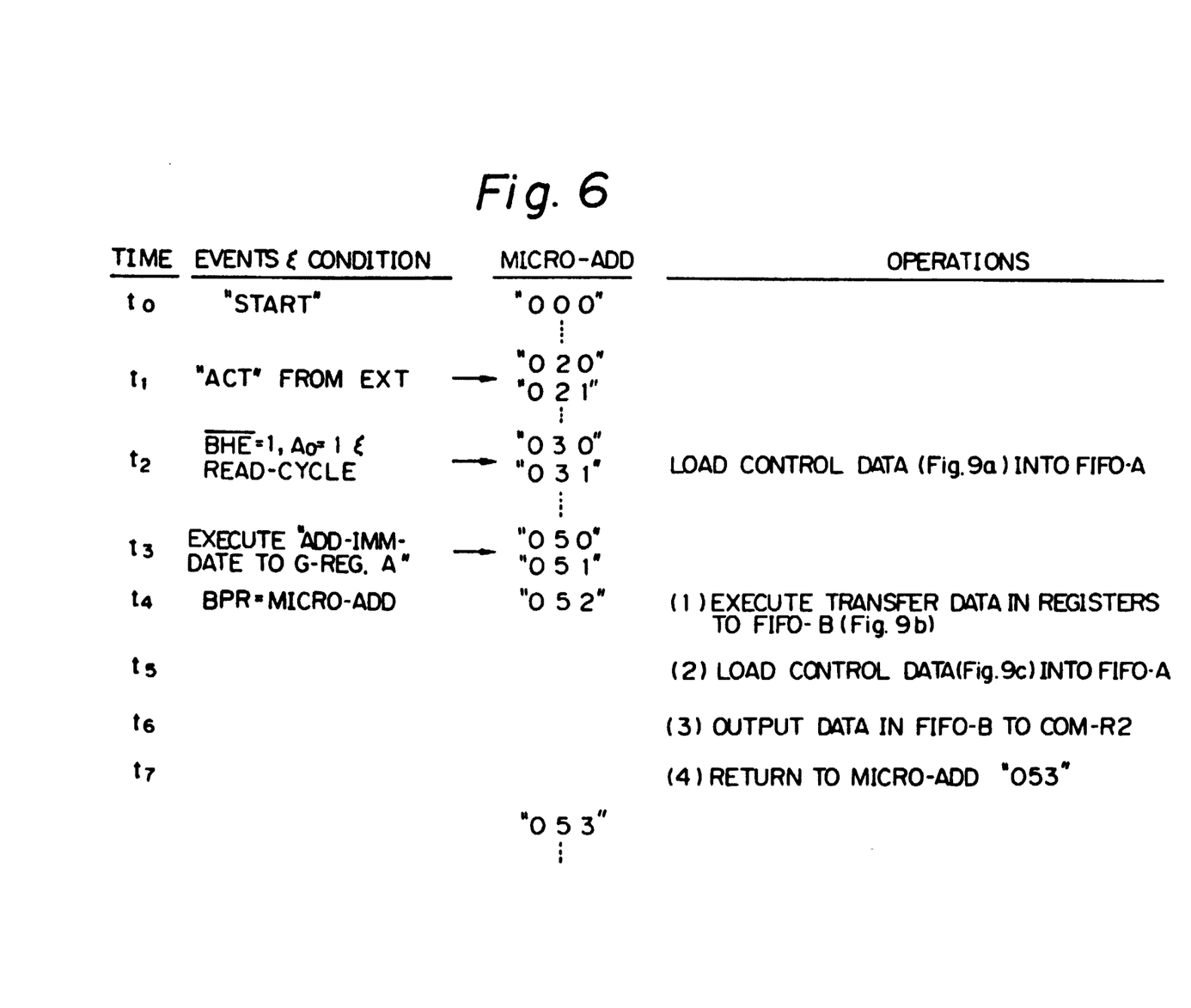
FIG. 6 is a view explaining an operation of the computer system in FIG. 4.

Referring to FIG. 6, the computer system starts at a time $t_0$ with a microaddress "000" of a hexadecimal in the MCS 4 and advances microaddresses in accordance with microprogram instructions. At a time $t_1$, the signal ACT from the EXT 35 is supplied to the BIU 20. After that, at a time $t_2$, the signal $\overline{BHE}$ of high level and $A_0$ of high level, indicating "WORD ACCESS ON DEBUG-MODE" as shown in FIG. 3, are supplied to the BIU 20 the MPU 10 through the DATA-BUS 100. Simultaneously, a signal designating a read cycle is also applied to the BIU 20.

Figure 9A:
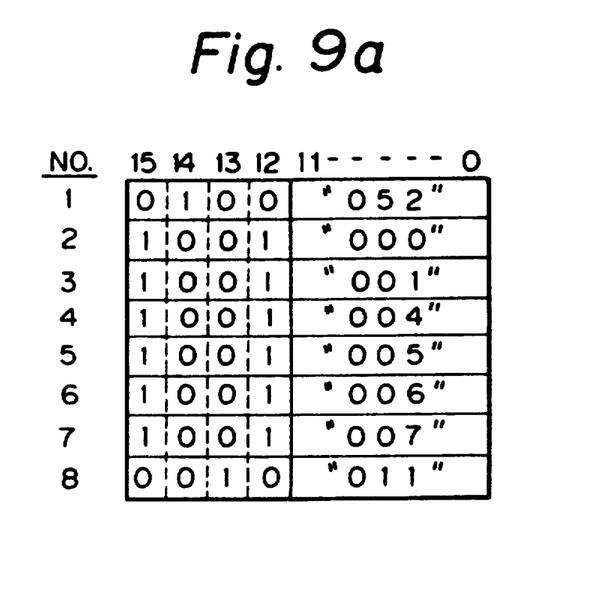
FIG. 9a is one view of data and instructions used in the computer system shown in FIG. 4 when the operation shown in FIG. 8 is effected.

In response to the application of the above control signals, the BIU 20 interrupts the operation of a microaddress "031" of a hexadecimal and effects an operation "LOAD CONTROL DATA INTO FIFO MEMORY, that is, loading control data as shown in FIG. 9a into the FIFO memory 49. Due to the above operation, eight control data in FIG. 9a are stored in the FIFO memory in the order of FIG. 9a. Each data configuration is as described with reference to FIG. 2. The meaning of the control data will be described later in detail. After completion of the above loading, the normal operation is restored. The operation of the microaddress "031" restarts and subsequent operations are continued.

The data is a first column in FIG. 9a is loaded into the break point register 41 together with the enable bit of logical "1".

Figure 7:
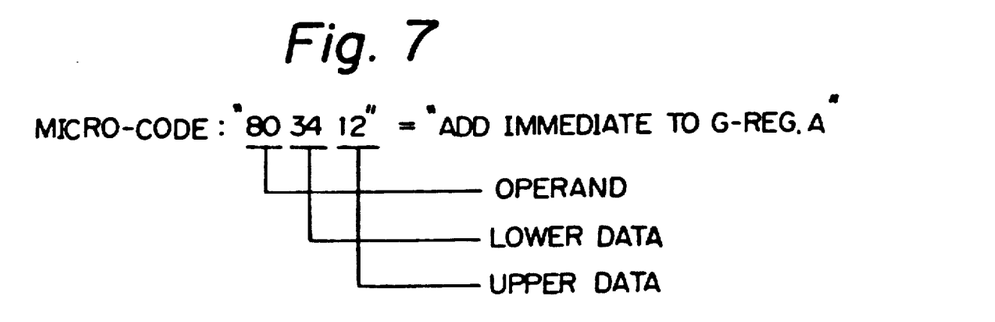
FIG. 7 is a view of an example of a micro code executed in the computer system in FIG. 4.
Figure 8:
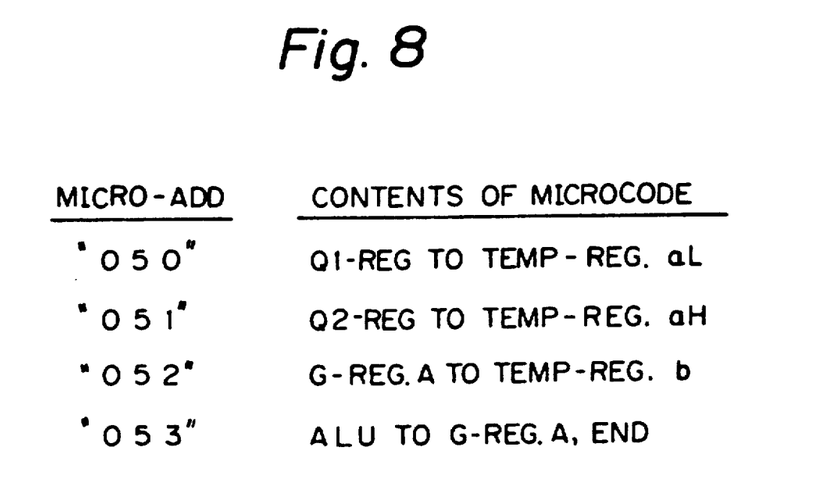
FIG. 8 is a view showing microcodes corresponding to the macrocode in FIG. 6.

When the IR 1 finds a microprogram instruction of "ADD IMMEDIATE TO GENERAL REGISTER A", which is defined by, for example, a macrocode "803412" in a hexadecimal form shown in FIG. 7 and consists of four microinstruction codes shown in FIG. 8 and stored in the MCS 4, the DEC 3 designates a start microaddress of "050". Thus, the microinstruction code in the microaddress "050" may be effected in the EU 6. In FIG. 7, the first two parts of the hexadecimal code "80" indicate an operand of the above "ADD IMMEDIATE TO GENERAL REGISTER A", the middle two parts of the hexadecimal code "34" a lower address to be loaded into the T-REG aL 63 in the EU 6, and the third two parts of the hexadecimal code "12" an upper address to be loaded into the T-REG aH 63. In accordance with the macrocode "803412", the microinstruction codes shown in FIG. 8 are defined and stored between the microaddresses "050" to "053" in the MCS 4, more specifically, in the region 4a. The contents of the microinstruction codes shown in FIG. 8 are as follows:

a. load half data in the lower address in the CHIP 30 into the Q1-REG 22 in the BIU 20 and transfer the same to the T-REG.aL 63, b. load another half data in the lower address to the Q2-REG 22 and transfer the same to the T-REG.aH 63, c. load another data in the upper address into the G-REG.A 65 and transfer the same to the T-REG.b 62, and d. add both data in the T-REG aL and aH 63 and the T-REG b 62 at the ALU 61, save the same into the G-REG.A 65, and terminate the microprogram instruction of the macrocode "803412".

Referring now back to FIG. 6, the first and second microinstruction codes in the microaddresses "050" and "051" are effected. When the microaddress "052" is reacted, since the address of "052" and the enable bit of logical "1" as shown in a first column in FIG. 9a were saved in the break point register 41, the operation mode of the computer system is changed to the debug mode, as described before with reference to FIG. 1. Accordingly, the data stored in the FIFO memory 49 and shown in FIG. 9a is supplied to the DEC 3 instead of the data from the MAR 2. Simultaneously, the SELECT 50 outputs the signal Sw to the FIFO memory 52.

Figure 9B:
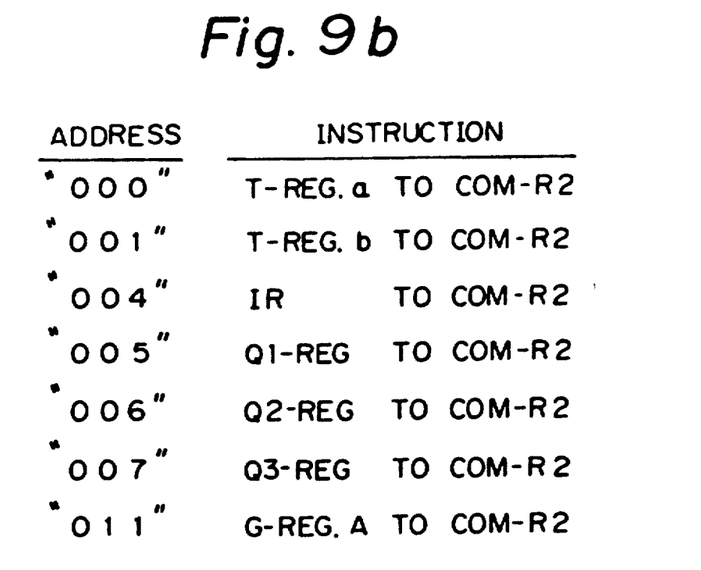
FIG. 9b is another view of data and instructions.

First, an address "000" in a hexadecimal shown in a second column in FIG. 9a is applied to the MCS 4, and thus an additional instruction stored in the address "000" of the region 4b, shown in FIG. 9b, is effected. The first additional instruction is of "transfer a content stored in the T-REG.aL+aH in the EU 6 to the COM-R2 21 in the BIU 2". Due to the execution of the first additional instruction, the content of the T-REG.a 63 is once transferred to the COM-R2 21. The COM-R2 21 is connected to the DATA-BUS 100, and thus the content in the COM-R2 21 is transferred on the DATA-BUS 100 and further output through the OUT-BUF 70. Simultaneously, the above address of bits 11 to 0 on the bus 115 and the state flags in the FLG-REG 69 are combined at the MIX 51, and, thus, the same is stored into the FIFO memory 52 from a first address therein. Other additional instructions in addresses between "001" and "011" in the region 4b, corresponding to the control data shown in FIG. 9a, are sequentially effected as similar to the additional instruction of the address "000". As a result, contents saved in the T-REG.a 63, the T-REG.b 62, the IR 1, and the Q1-REG to Q3-REG 22 to 24, which cannot be accessed by requirements from the programs, and the content in the G-REG.A 65, can be in a visual form through the OUT-BUF 70.

The last control data shown in FIG. 9a is of bit 13 of logical "1" and bits 15 and 14 of logical "1" indicating "LOAD CONTROL DATA INTO FIFO MEMORY" as shown in FIG. 2. Accordingly, as mentioned above with respect to the operation at the time t2, control data (shown in FIG. 9C in this case) are loaded into the FIFO memory 49. Clearly, each control data is defined by the construction shown in FIG. 2. All control data include a bit of logical "1", thus, the debug mode is still continued. Also, bit 15 is logical "1". In addition, bits 15 and 14 of the last control data is FIG. 9a were logical "0" indicating "FIFO MEMORY FULL" as shown in FIG. 2. As a result, the SELECT 50 clears the signal Sw and outputs the signal SR of high level to the FIFO memory 52. Furthermore, an additional instruction in an address "008" in the region 4b means "OUTPUT DATA IN FIFO MEMORY 52 TO COM-R2" as shown in FIG. 9d. Therefore, eight data stored in the FIFO memory 52 during the operation at the time t4 are consecutively transferred to the COM-R2 21 in the BIU 20, consequently outputting them to the OUT-BUF 70. These output data can be used for the correspondence of the data of the registers previously output.

Figure 9C:
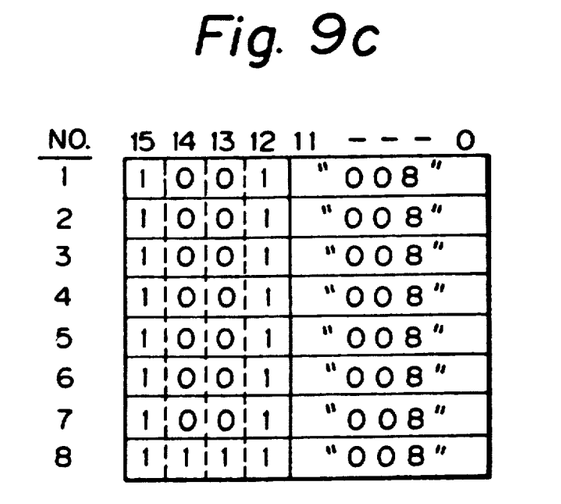
FIG. 9c is a third view of data and instructions
Figure 9D:
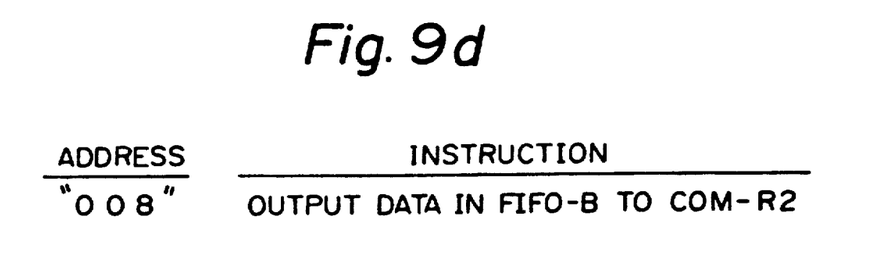
FIG. 9d is also a view of data and instructions.

The last control data in FIG. 9C has bits 15 to 13 of logical "1" indicating "RETURN TO NORMAL-MODE OPERATION". Accordingly, after completion of the above control operation for the debugging, the control of the MPU 10 will be restored to the normal mode and the halted microinstruction in an address "053" in the region 4a will start at a time t7.

The computer system in FIG. 4 may store addresses from the MAR 2 and flags in the FLG-REG 69 corresponding to the instructions of the addresses into the FIFO memory 52 through the MIX 51 at any time. The stored data in the FIFO memory 52 is output through the OUT-BUF 70. This is available for easily testing the operation of the MPU 10.

Figure 10:
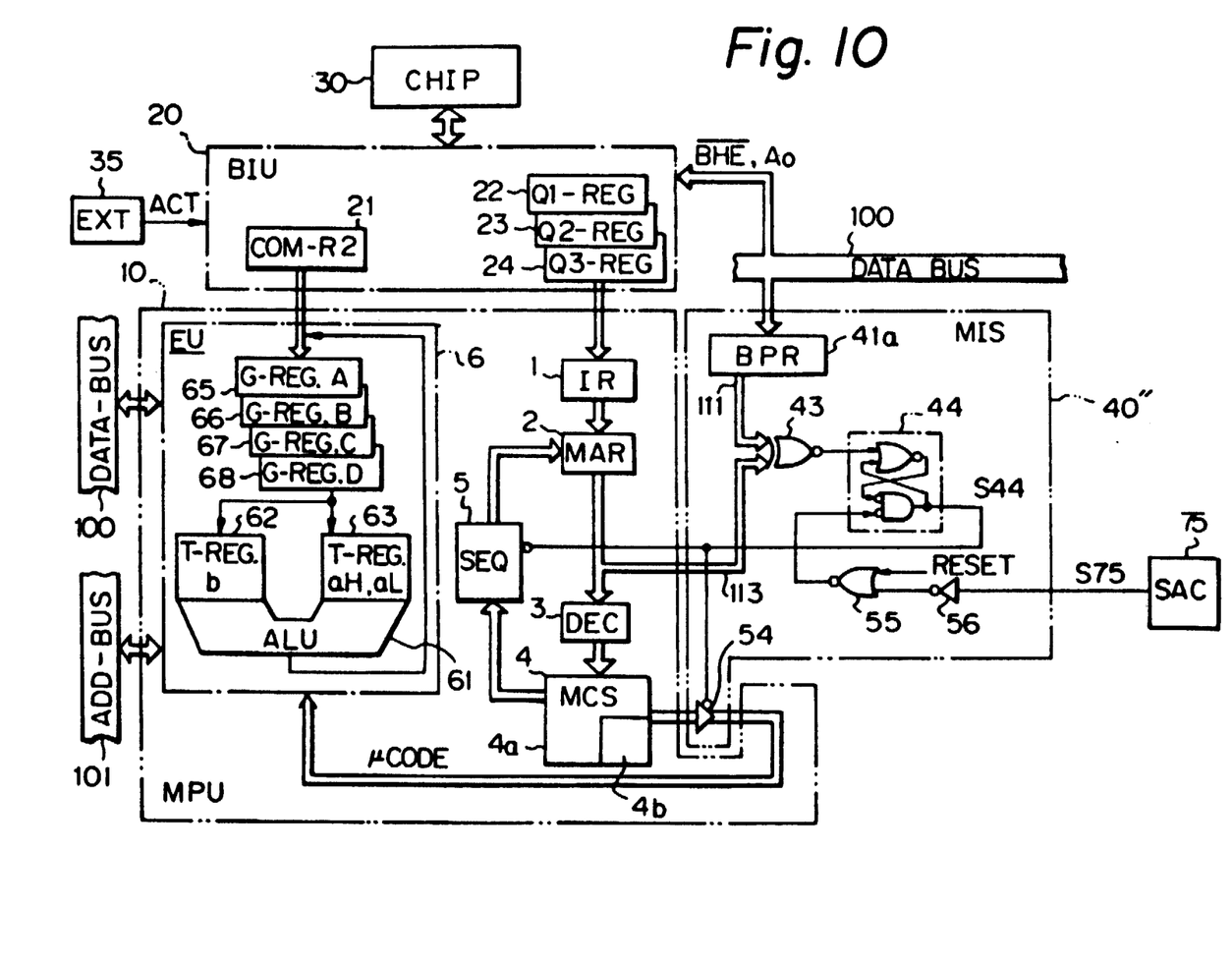
FIG. 10 is a circuit diagram of still another embodiment of a computer system having an instruction surveillance configuration in accordance with the present invention.

FIG. 10 is a circuit diagram of still another embodiment of a computer system.

In FIG. 10, the MPU 110, the BIU 20, the CHIP 30, and the EXT 35 are basically identical to those in FIG. 1. The computer system also includes a MIS 40" and a synchronous-signal application circuit (SAC) 75. The MIS 40" includes a break point register 41a which does not include an enable bit, the ENOR 43, the FF 44, an output gate 54, NOR gate 55, and an INV 56. An output signal S44 at the FF 44 is connected to the SEQ 5 and the output gate 54 to enable or disable these.

The operation of the computer system will be described.

A microaddress of a microinstruction, which is required to halt thereat, is stored into the break point register 41a. When the address in the break point register 41a does not coincide with an address from the MAR 3, an output of ENOR 43 is high level, with a result that the FF 44 is reset. The signal S44 of high level is supplied to the SEQ 5 and the output gate 54 to ensure the operation of the MPU 10 in the normal-mode operation.

When the address in the break point register 41a coincides with the address from the MAR 3, the FF 44 is set. Due to the application of the signal S44 of low enable, the operation of the SEQ 5 is halted. Simultaneously, the output gate 54 inhibits passage of the μCODE from the MCS 4 therethrough, with the result that the operation of the microinstruction is compulsorily and temporarily stopped. After a while, upon supply of a synchronous signal S75 at the SAC 75, the FF 44 is reset, restarting the halted microinstruction. The generation of the synchronous signal S75 at the SAC 75 may be effected arbitrarily, for example, in response to timing of external equipment jointly operated with the computer system. The restart can also be achieved by applying a RESET signal to the NOR 55.

In the prior art, the halt can be effected only with every microprogram instruction. In the computer system shown in FIG. 10, the halt can be effected not only with every microprogram instruction, but also any microinstruction or subinstructions code forming a microprogram instruction or microprogram designated by the user. In addition, the restore of the halt can be effected in response to the synchronization of the other devices.

Clearly, the instruction surveillance circuits shown in FIGS. 1, 4, and 10 may be combined with each other.

Many widely different embodiments of the present invention may be constructed without departing from the spirit and scope of the present invention. It should be understood that the present invention is not limited to the specific embodiments described in this specification, except as defined in the appended claims.

I claim:

1. A computer system for processing computer instructions provided thereto, comprising:
  a data bus;
  instruction processing means for processing the computer instructions containing microprogram instructions and including:
    instruction code store means for storing at least one microinstruction code group having a plurality of fist microinstruction, the first microinstructions perform a corresponding one of the microprogram instructions;

instruction decode means, connected to said instruction code store means, for decoding the corresponding one of said microprogram instructions nd advancing a first address of the first microinstructions of the corresponding one of said microprogram instructions, the corresponding one of the microprogram instructions being defined by said plurality of first microinstructions; and instruction execute means, connected to said instruction code store means and said instruction decode means, for executing said first microinstructions, said instruction decode store means further storing a plurality of second microinstructions, said second microinstructions for performing control of said instruction processing means;

control means, connected to said instruction processing means, for comparing a user entered preset address and the first address from said instruction decode means, stopping operation of said first microinstruction producing a stopped operation and supplying system control data including control bits and a monitor program instruction address designating said second microinstructions in said instruction code store means when said preset address coincides with said first address, said instruction execute means executing said second microinstruction based on said control bits in said system control data nd the monitor program instruction address;

said instruction processing means including program registers holding program data nd connected to said data bus and said program registers being accessible by programs, and control registers holding the system control data, and control circuits having control states and connected to said data bus and effecting said instructions, and said control registers and control circuits being not accessible by said programs, said second microinstructions outputting the program data in said registers, the system control data in said control registers and the control states of said control circuits to the data bus in said computer system, the states, the program data nd system control data on said data bus being output through an output device;

bus interface means, connected to said instruction processing means and said control means through said data bus and including bus control registers and bus control circuits connected to said data bus, said bus control registers and said bus control circuits being not accessible by said program, said second microinstructions further for outputting bus control data in said bus control registers and bus states of said bus control circuits to said data bus;

said control means including first memory mans for storing said system control data, said bus interface means storing a plurality of said system control data into said fist memory means through said data bus based on an application of control signals; and said instruction execute means continuously executing said second microinstructions based on said control bits of said control data, when said preset address coincides with said second address from said instruction decode means.

2. A computer system according to claim 1, wherein said system control bits in said control data include mode bits designating change of an operation mode of said instruction processing means form a normal-mode operation to a control-mode operation, or from control-mode operation to the normal-mode operation, said instruction processing means executing said second microinstructions in said control mode when said user entered preset address coincides with said first address from said instruction decode means and is restored in said normal-mode operation, based on said control bits.

3. A computer system according to claim 2, wherein said control means includes a preset address register holding and user entered preset address, a compare circuit, connected to said present address register and said instruction decode means, comparing said user entered present address and said first address from said instruction decode means and outputting a coincidence signal when said preset address coincides with said first address, a latch circuit, connected to said compare circuit, latching said coincidence signal, a first gate gating said first address passing therethrough, a second gate connected to said latch circuit and gating said control data passign therethrough, and a switch circuit connected between said instruction decode means and said compare circuit, said fist gate and said second gate being operated based on said coincidence signal so that said first gate changes to a closed state passing said fist address therethrough when said coincidence signal is disabled and, otherwise, said second gate passing said control data from said first memory means therethrough, and said switch circuit supplying said second address to said compare circuit when said coincidence signal is disabled and, otherwise, said system control data and the monitor program instruction address is supplied to said instruction code store means through said instruction decode means.

4. A computer system according to claim 3, wherein said control means further includes:

combining circuit means for combining said first address and said steps of said control circuit in said instruction processing means and said bus interface means producing combined data; and second memory means for storing said combined data nd outputting said combined data to said data bus based on said coincidence signal.

5. A computer system according to claim 1, wherein said control means restoring said stopped operation when a reset signals is supplied thereto.

6. A computer system, comprising:

instruction processing means for processing computer instructions having microprogram instructions and including:

instruction code store means for storing at least one instruction code group having microinstructions for a corresponding one of the microprogram instructions;

instruction decode means, connected to said instruction code store means, for decoding the corresponding one of the microprogram instructions and advancing an address of said microinstructions o the corresponding one of the microprogram instruction; and execute means, connected to said instruction code store means and said instruction decode means, for executing said microinstructions; and control means, connected to said instruction processing means, for detecting execution of one of said microinstructions at a particular user specified address, storing the one of the microinstructions and outputting the one of the microinstructions based on control signal and storing control data combined with said address of said microinstructions and control states in said instruction processing means and outputting the control data, said address and the states, said control means including:

combining circuit means for combining said address and said states in said instruction processing means producing combined data; and memory means for storing said combined data and outputting said combined data to a data bus based on said control signals.

7. A computer system according to claim 6, wherein said control mans stores program data combined with said address, said control data and control states in said instruction processing means to thereby produce said combined data and outputs said combined data.

8. A computer system according to claim 7, wherein said control means stores said combined data and outputs said combined data to a data bus in response to said control signals.

9. A computer system for processing an instruction performed by a microprogram, the microprogram including microinstruction each having microinstruction address, said system comprising:

instruction destination means for providing a first microinstruction address;

instruction storage means for producing a first microinstructions corresponding o the first microinstruction address;

execution means for executing a first operation specified by the first microinstruction; and address substitution means for detecting coincidence between a user specified target microinstruction address and the first microinstruction address and supplying a second microinstruction address to said instruction storage mans, said instruction storage means producing a second microinstruction and said execution means executing a second operation corresponding to the second microinstructions.

10. A system as recited in claim 9, wherein said microprogram comprises a third microinstruction, said storage means outputting a third microinstruction address corresponding to the third microinstruction, said third microinstruction address being stored in said instruction designation means, said system further comprising address blocking means, between said instruction designation means and said instruction storage means, of blocking application of the third microinstruction address to said instruction storage means while said second microinstruction address is being applied to said instruction storage means.

11. A system as recited in claim 10, further comprising address storage means for storing the second microinstruction address and providing the second microinstruction address to said instruction storage means.

12. A system as recited in claim 11, wherein said address storage means stores addresses of microinstructions comprising a monitor microprogram, said monitor microprogram causing said execution means to output a status of said system.

13. A system as recited in claim 10, wherein said execution means includes flag registers and said system further comprises:

means for combining contents of said flag registers with said first microinstruction address and producing a combined output; and output storage means for storing and outputting the combined output.

14. A system as recited in claim 9, further comprising:

means for stopping the third microinstruction address from being stored in said instruction designation means when coincidence is detected by said address substitution means; and microinstruction blocking means for blocking application of the first microinstruction to said execution means when coincidence is detected.

* * * * *

UNITED STATES PATENT AND TRADEMARK OFFICE
CERTIFICATE OF CORRECTION

PATENT NO. : 5,129,079

DATED : July 7, 1992

INVENTOR(S) : Takumi Miyashita et al.

It is certified that error appears in the above-identified patent and that said Letters Patent is hereby corrected as shown below:

Column 1, line 23, after "macro" insert --instruction--;

Column 1, line 24, delete "instruction";

Column 1, line 30, delete "instructions".

Column 2, line 5, "microprogram" should be --microprograms--;

Column 2, line 11, delete "instructions";

Column 2, line 28, delete "instruction";

Column 2, line 43, delete "codes";

Column 2, line 44, after "microinstruction" insert --code-- and after "code" insert --microinstruction--.

Column 3, line 13, "disable" should be --disabled--.

Column 4, line 27, delete "having" and after "register" insert --having--.

Column 6, line 8, "Provided" should be --provided--;

Column 6, line 16, "Ao" should be --$A_o$--(subscripted).

UNITED STATES PATENT AND TRADEMARK OFFICE
CERTIFICATE OF CORRECTION

PATENT NO. : 5,129,079
DATED : July 7, 1992
INVENTOR(S) : Takumi Miyashita et al.

It is certified that error appears in the above-identified patent and that said Letters Patent is hereby corrected as shown below:

Column 13, line 28, "destination" should be --designation--.

Column 14, line 2, "microinstructions" should be --microinstruction--.

Signed and Sealed this

Fifth Day of October, 1993

BRUCE LEHMAN

*Attest:*

*Attesting Officer*　　*Commissioner of Patents and Trademarks*